M. FELLOWS.
CARRIER FOR PNEUMATIC TUBE APPARATUS.
APPLICATION FILED MAY 28, 1917.

1,240,327.

Patented Sept. 18, 1917.

Witness:
John Enders

Inventor:
Mel Fellows,
By George Manker
Atty.

UNITED STATES PATENT OFFICE.

MELCHIZEDK FELLOWS, OF CHICAGO, ILLINOIS.

CARRIER FOR PNEUMATIC-TUBE APPARATUS.

1,240,327.  Specification of Letters Patent.  Patented Sept. 18, 1917.

Application filed May 28, 1917. Serial No. 171,369.

*To all whom it may concern:*

Be it known that I, MELCHIZEDK FELLOWS, a citizen of the United States, residing in Chicago, Cook county, Illinois, have invented a new and useful Improvement in Carriers for Pneumatic-Tube Apparatus, of which the following is a specification.

My invention relates particularly to a head for cash, document and parcel carriers and the like used in pneumatic tubes.

The object of my invention is to provide a pneumatic carrier head which can be expanded or contracted to fit any tube within a certain diameter and conform itself to any shape or bend in the tube in which a carrier body must pass.

A further object is to provide a carrier head which will not stick in the tubes thereby preventing the carriers from being delayed.

A further object is to provide a pneumatic carrier head which will at all times keep the tubes perfectly clean and free from corrosion with a minimum amount of friction.

A further object is to provide a pneumatic head that will arrive at the end of its journey without the usual bump or thud and with a minimum of noise.

Further objects of my invention are to secure greater wearing qualities with minimum of cost of the original production and economy in the operating cost adding to the length of life of the carrier, reducing the air pressure required and a saving of time due to delays by sticking and like conditions produced with the old carrier heads.

With a further object in view of producing a pneumatic carrier head of simple, strong, durable and inexpensive construction, my invention consists of certain novel details of construction as hereinafter described and claimed.

Figure 1:
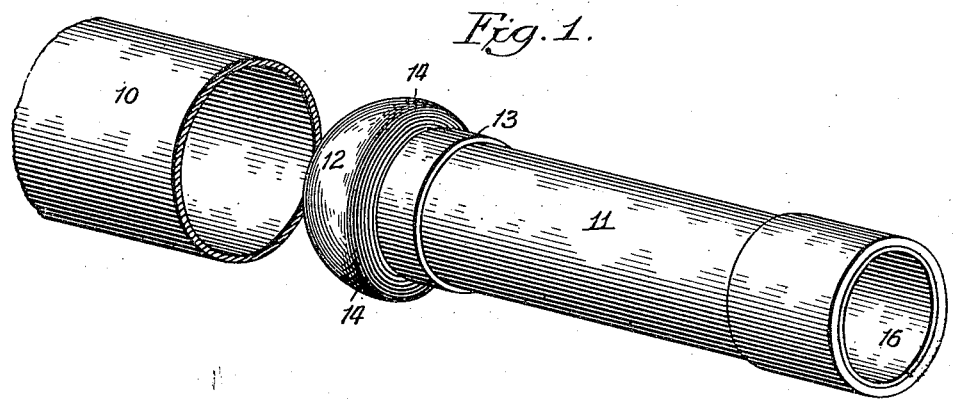
Figure 2:
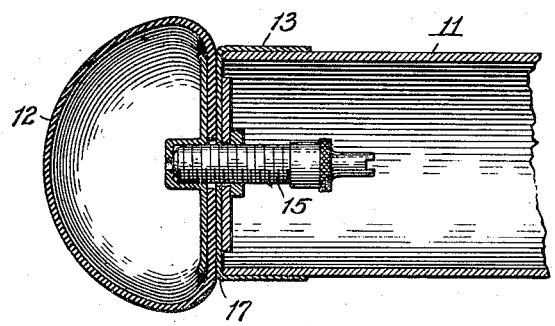
Figure 3:
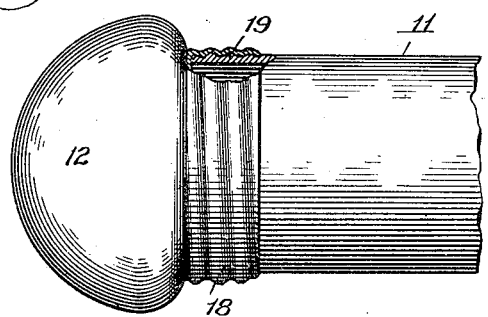

My invention is illustrated in the accompanying drawing in which Figure 1 is a perspective view of my pneumatic carrier head as employed on a cash carrier and the like shown about to enter the pneumatic tube. Fig. 2 is a longitudinal section of the pneumatic carrier head showing its connection with the carrier proper and the arrangement of valve. Fig. 3 is a perspective view of my pneumatic carrier head screw-threaded onto the carrier proper.

In the drawings, 10 is a pneumatic tube ready to receive the carrier. 11 is the carrier complete shown about to enter the pneumatic tube 10. 12 is the pneumatic head attached to the cylinder of the carrier by means of the collar 13 which fits snugly over and around the end of the carrier cylinder. It will be seen that the pneumatic head 12 may be manufactured of any desired shape or material. If desired, the head may be strengthened at 14 to correspond with the tread of a pneumatic wheel so as to add to the life thereof and prevent wear as it passes through the tube 10, sufficient resiliency remaining to secure all of the pneumatic qualities desired. In order that the head 12 may be kept inflated to the desired point, I have provided a valve 15 which may be any ordinary valve of suitable size to satisfy the requirements of the particular place. This valve may be reached from the open end 16 of the carrier and operates much as a valve on a bicycle tire is operated. The pneumatic head 12 may be cemented to the part 17, or, if preferred, might be attached thereto by means of rivets, bolts, or any suitable fastening means.

In Fig. 3, however, I have shown the pneumatic head 12 with a screw threaded collar 18 which can be screwed down over the corresponding screw-threaded end of the cylinder of the carrier as shown at 19 which makes a very close fitting connection and one that is easily removed in case the pneumatic head is injured or when the parts become worn out.

My pneumatic carrier head can be fitted to and used with substantially any carrier of this class at moderate expense and with little trouble. The sticking and clogging of the tubes so prevalent with the old tubes is made impossible with my pneumatic carrier head and the delays thus caused by the old carriers will be avoided. Special cleaning of the tubes where the old carriers have been employed is required but with the use of this pneumatic head, the tubes will always be kept clean and bright thereby saving time and expense. Noises and jars are reduced to a minimum; the expense both of making and upkeep greatly decreased and the maximum of efficiency in operation secured.

Having thus described my invention, what I claim as new and desire to secure by Letters Patent is:

1. The combination in a carrier tube of a pneumatic head, a cylinder, means for securing the head to the cylinder and a valve located in the inner part of the head and extending into the cylinder, for inflating the head.

2. The combination in a carrier tube of a flexible head having a tread portion suitably reinforced, a cylinder, a valve located at the inner end of the head and extending into the cylinder and a screw threaded connection between the cylinder and head.

In witness whereof, I hereunto subscribe my name to this specification in the presence of two witnesses.

MEL FELLOWS.

Copies of this patent may be obtained for five cents each, by addressing the "Commissioner of Patents, Washington, D. C."